(12) United States Patent
Ishida et al.

(10) Patent No.: US 7,709,591 B2
(45) Date of Patent: May 4, 2010

(54) TELECHELIC POLYMER COMPOSITION

(75) Inventors: Hatsuo Ishida, Shaker Heights, OH (US); Masanori Nakamura, Tsukuba (JP)

(73) Assignees: Sekisui Chemical Co., Ltd., Osaka (JP); Case Western Reserve University, Cleveland, OH (US)

( * ) Notice: Subject to any disclaimer, the term of this patent is extended or adjusted under 35 U.S.C. 154(b) by 77 days.

(21) Appl. No.: 12/056,153

(22) Filed: Mar. 26, 2008

(65) Prior Publication Data
US 2009/0247723 A1 Oct. 1, 2009

(51) Int. Cl.
*C08G 8/02* (2006.01)
(52) U.S. Cl. ..................... 528/128
(58) Field of Classification Search ........... 528/94, 528/103, 128
See application file for complete search history.

(56) References Cited
U.S. PATENT DOCUMENTS

| | | | | |
|---|---|---|---|---|
| 4,767,838 A | * | 8/1988 | Clendinning et al. | 528/125 |
| 4,931,530 A | * | 6/1990 | Fukawa et al. | 528/125 |
| 6,207,786 B1 | * | 3/2001 | Ishida et al. | 528/94 |

FOREIGN PATENT DOCUMENTS

| | | |
|---|---|---|
| JP | 2003-64180 | 3/2003 |
| JP | 2004043622 A * | 2/2004 |

OTHER PUBLICATIONS

Tsutomu Takeichi, et al.; "Synthesis and thermal cure of high molecular weight polybenzoxazine precursos and the properties of the thermosets"; Polymer 46 (2005); pp. 12172-12180.

* cited by examiner

*Primary Examiner*—Randy Gulakowski
*Assistant Examiner*—Shane Fang
(74) *Attorney, Agent, or Firm*—Sughrue Mion, PLLC

(57) ABSTRACT

A telechelic polymer composition comprising a telechelic polymer having phenolic hydroxyl groups at both ends and having a weight average molecular weight in the range of 1,000 to 10,000, and a compound having a benzoxazine ring structure or a compound having a naphthoxazine ring structure.

3 Claims, 3 Drawing Sheets

TELECHELIC POLYMER COMPOSITION

FIELD OF THE INVENTION

The present invention relates to a telechelic polymer composition, and more particularly, to a telechelic polymer composition with improved mechanical properties (particularly, breaking elongation).

DESCRIPTION OF THE RELATED ART

Polybenzoxazine becomes a hard and highly heat resistant resin when heated. Especially, due to its excellent char yield (rate of carbonization), the resulting resin is expected to have wide applications not only as a material for the use in electronic and electric instruments, but also as a material for the use in the fields of space and aeronautics as well as in the fields of electronic telecommunications.

For example, Japanese Unexamined Patent Publication No. 2003-64180 or literature (Tsutomu Takeichi, Polymer 46 (2005) 12172-12180) discloses a method of producing a high molecular weight benzoxazine compound in advance, and cross-linking the compound by heating to produce a cured product.

BRIEF SUMMARY OF THE INVENTION

Under such circumstances, the present invention provides a telechelic polymer composition having improved mechanical properties (particularly, breaking elongation).

The inventors of the present invention devotedly conducted research, and as a result, found that a telechelic polymer composition comprising a telechelic polymer and a compound having a benzoxazine ring structure or a compound having a naphthoxazine ring structure, and a heat cured product of telechelic polymer formed by capping the phenolic hydroxyl groups at both ends of a telechelic polymer with benzoxazine ring structures, exhibit high breaking elongation, thus completing the present invention.

That is, the present invention is as follows.

1. A telechelic polymer composition comprising a telechelic polymer having phenolic hydroxyl groups at both ends and having a weight average molecular weight in the range of 1,000 to 10,000, and a compound having a benzoxazine ring structure or a compound having a naphthoxazine ring structure.

2. The telechelic polymer composition according to 1 above, wherein the telechelic polymer has a polyether ketone structure in the main chain.

3. A telechelic polymer having a weight average molecular weight in the range of 1,000 to 10,000, the telechelic polymer having at least 10% by mole or more of the phenolic hydroxyl groups at both ends capped with a benzoxazine ring structure or a naphthoxazine ring structure.

4. The telechelic polymer according to 3 above, having a polyether ketone structure in the main chain.

5. A telechelic polymer composition comprising the telechelic polymer according to 3 above.

6. A telechelic polymer composition comprising the telechelic polymer according to 4 above.

The telechelic polymer composition obtained by the present invention has a low melt viscosity, and thus is easily moldable. Furthermore, a cured product obtained by curing the composition by heating has excellent heat resistance and mechanical strength, and thus can be suitably used in electric and electronic parts, automobile parts, copper clad laminate boards, printed boards, refractory coatings, matrix resin for composite materials, and the like.

DETAILED DESCRIPTION OF THE INVENTION

Figure 1:
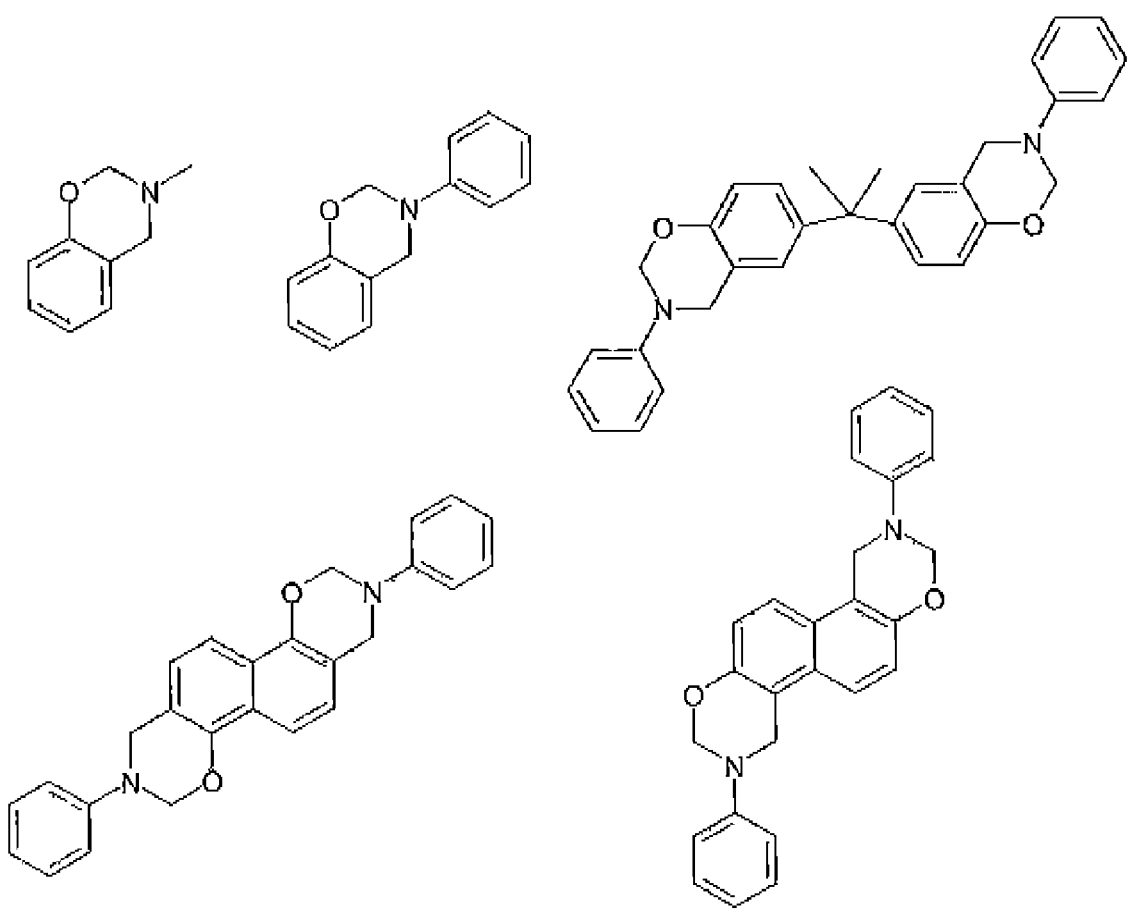
FIG. 1 shows various compounds having the benzoxazine ring structure or the naphthoxazine ring structure.

The telechelic polymer composition of the present invention is a telechelic polymer composition containing a telechelic polymer having phenolic hydroxyl groups at both ends and having a weight average molecular weight in the range of 1,000 to 10,000, and a compound having a benzoxazine ring structure or a compound having a naphthoxazine ring structure.

As the polymer used in the main chain of the telechelic polymer contained in the telechelic polymer of the present invention, polycarbonate, polysulfone, polyallylate, polyether ketone and the like can be suitably used from the viewpoint of heat resistance, and polyallylate and polyether ketone which are easily controllable to convert the ends to phenol structures, can be more suitably used. As the telechelic polymer of the present invention, a telechelic polymer having a polyether ketone structure is particularly suitable.

The telechelic polymer of the present invention is not particularly limited, but a telechelic polymer represented by the following formula (I) or the following formula (II) may be mentioned.

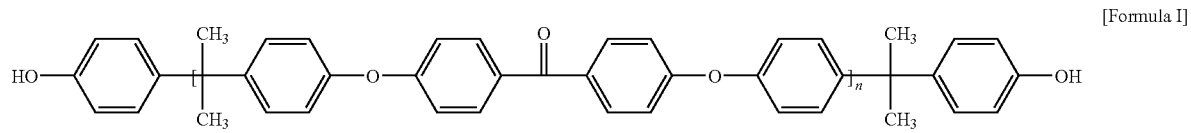

[Formula I]

having at least 10% by mole or more of the phenolic hydroxyl wherein n represents an integer of 1 or more,

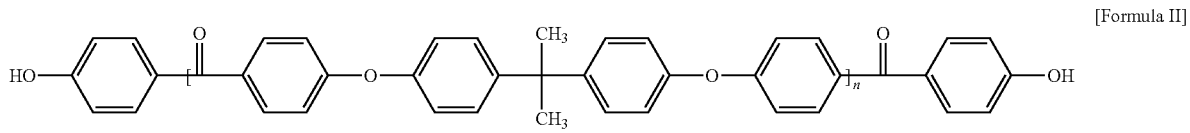

[Formula II]

wherein n represents an integer of 1 or more.

Furthermore, the telechelic polymer of the present invention is a telechelic polymer having a weight average molecular weight in the range of 1,000 to 10,000, the telechelic polymer having at least 10% by mole or more of the phenolic hydroxyl groups at both ends capped with a benzoxazine ring structure or a naphthoxazine ring structure.

The telechelic polymer of the present invention capped with a benzoxazine ring structure or a naphthoxazine ring structure is not particularly limited, but for example, as the telechelic polymer capped with a benzoxazine ring structure, a telechelic polymer selected from the group represented by the following formula (III) may be mentioned.

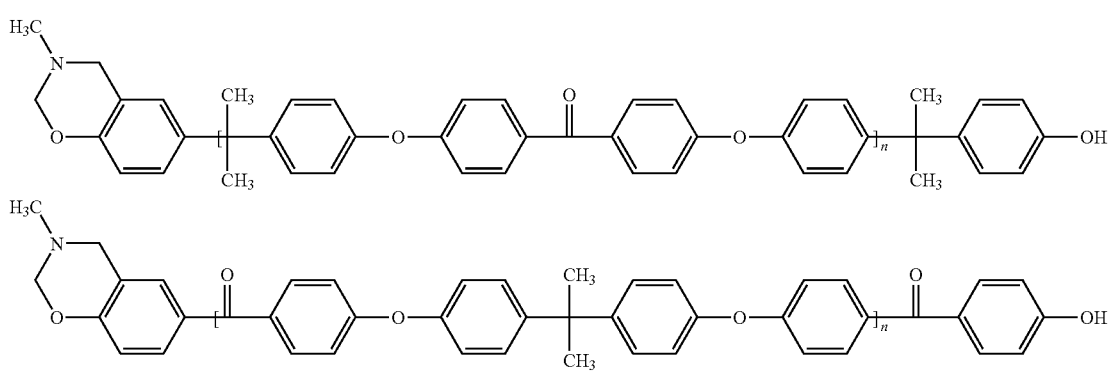

[Formula III]

wherein n represents an integer of 1 or more.

The telechelic polymer composition of the present invention is a composition containing the telechelic polymer capped with a benzoxazine ring structure or a naphthoxazine ring structure.

Method for Producing a Telechelic Polymer

The method for producing a telechelic polymer of the present invention is not particularly limited, but hereinafter, there will be illustrated a method for producing a telechelic polymer represented by the formula (I), having a polyether ketone structure with the ends controlled to be converted to phenolic hydroxyl groups.

Bisphenol is not particularly limited, but a phenol such as bisphenol A, bisphenol F or bis(4-hydroxyphenyl)sulfone can be used. According to the present invention, it is preferable to use bisphenol A from the viewpoint of solubility.

The aromatic ketone is not particularly limited, but 4,4-difluorobenzophenone, 4,4'-dichlorobenzophenone or the like is preferred from the viewpoint of reactivity.

The solvent is not particularly limited as long as it dissolves the starting material to some extent, and does not inhibit the polymerization reaction between bisphenol and aromatic ketone, but for example, N-methylpyrrolidone, dimethylacetamide, dimethylsulfoxide, dimethylformamide, dioxane and the like may be mentioned.

Since the above polymerization reaction is accompanied by generation of acid, it is preferable to use an alkali compound as a neutralizing agent in order to accelerate the reaction. The alkali compound is not particularly limited, but sodium carbonate, potassium carbonate or various amines can be used.

The reaction temperature and the reaction time are not particularly limited, but the reaction may be carried out typically at a temperature of about 100° C. to 180° C. for 1 to 5 hours.

The telechelic polymer can be precipitated by adding the solution obtained after the reaction to, for example, a large amount of a poor solvent such as water, and when the precipitate is separated and dried, the desired telechelic polymer can be obtained.

The telechelic polymer of the present invention can be produced, specifically, according to the following Scheme 1.

Scheme 1: Synthetic scheme for the telechelic polymer

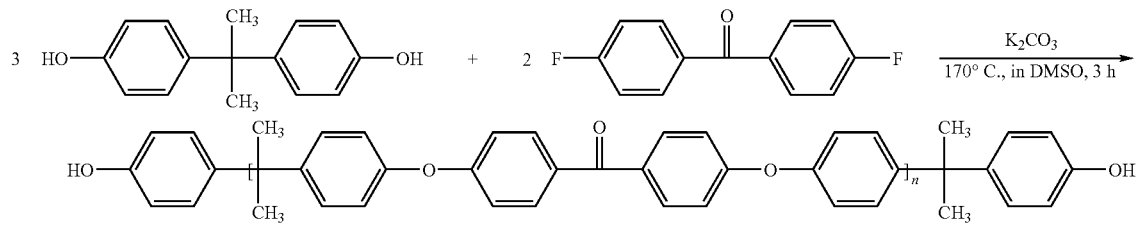

Method for Producing a Telechelic Polymer Capped with Benzoxazine Ring Structure The telechelic polymer capped with a benzoxazine ring structure of the present invention is a polymer obtained by capping a portion of the phenolic hydroxyl groups of the telechelic polymer which has phenolic hydroxyl groups at both ends as described above, with benzoxazine. By capping a portion of the phenolic hydroxyl groups at both ends with benzoxazine, the telechelic polymer itself can be imparted with thermal curability. An exemplary reaction method is presented in the following Scheme 2.

The upper limit of the mixing ratio of the amine is not particularly limited, since any excess amine can be easily eliminated after the reaction.

In the case of thermally curing the telechelic polymer capped with a benzoxazine ring structure of the present invention alone, it is preferable that at least 10% by mole or more, preferably 50% by mole or more, of the phenolic hydroxyl groups at the ends of the telechelic polymer are capped with a benzoxazine ring structure. If the capping by a benzoxazine ring structure is achieved in less than 10% by mole, when the Scheme 2: Synthetic scheme for the capping telechelic polymer with a benzoxazine ring structure

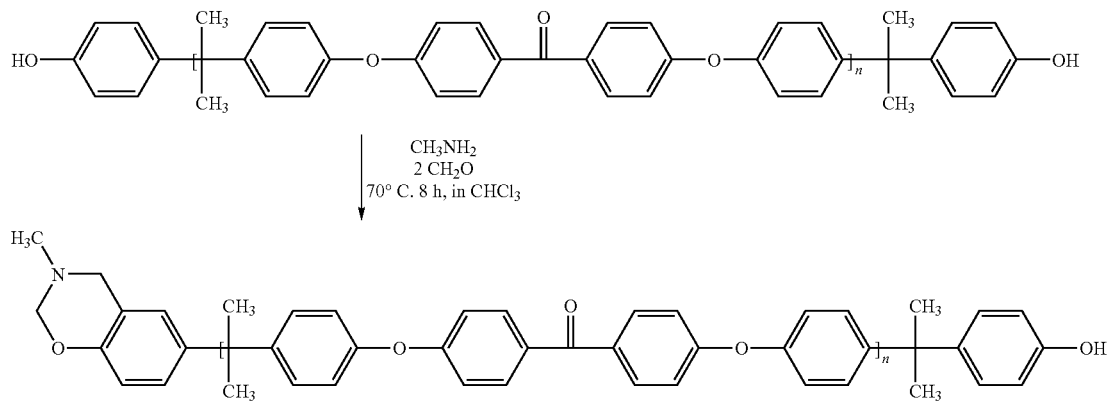

The telechelic polymer capped with a benzoxazine ring structure of the present invention is not particularly limited, but basically, for example, the telechelic polymer can be produced by a method of mixing three components, namely, a telechelic polymer having phenolic hydroxyl groups at both ends of the polymer chain, an amine and formaldehyde, adding a solvent as necessary, and heating the mixture while stirring.

The amine is not particularly limited so long as it is monoamine, but aniline, methylamine, propylamine or the like can be used.

Formaldehyde can be used in the form of paraformaldehyde which is a polymer, or in the form of formalin which is an aqueous solution.

With regard to the mixing ratio for the telechelic polymer and amine, it is preferable to add at least 0.05 moles or more of the amine, relative to 1 mole of the telechelic polymer having phenolic hydroxyl groups at both ends of the polymer chain.

telechelic polymer is thermally cured, the strength of the thermally cured product may be extremely deteriorated.

The mixing ratio of formaldehyde is not particularly limited, but it is preferable to incorporate formaldehyde in a mole number which is twice the mole number of the amine, so as to coincide the mixing ratio with the stoichiometric ratio.

The solvent used in the present invention is not particularly limited, but dioxazine, toluene, chloroform, xylene or the like is suitably used from the viewpoint of reactivity.

The reaction temperature and the reaction time are not particularly limited, but the reaction may be carried out typically at a temperature of about 50° C. to 110° C. for 2 hours to 24 hours. According to the present invention, it is particularly preferable to perform the reaction at 70° C. for 12 hours using chloroform as the solvent, from the viewpoint of preventing any side reactions during the reaction.

The polymer after the reaction can be precipitated by adding the solution obtained after the reaction to, for example, a large amount of a poor solvent such as methanol, and when the precipitate is separated and dried, the desired telechelic polymer capped with a benzoxazine ring structure can be obtained.

Production of Telechelic Polymer Composition

As for the telechelic polymer of the present invention, even if the telechelic polymer is a telechelic polymer having phenolic hydroxyl groups at the ends, as represented by the above formula (I) or (II), a telechelic polymer composition generally capable of thermally curing can be obtained by separately mixing a compound having a benzoxazine ring structure (hereinafter, may also be described as benzoxazine compound).

The benzoxazine compound to be mixed is not particularly limited, but for example, those benzoxazine compounds generally used as thermally curable resins, such as 3,4'-dihydro-3-methyl-2H-1,3'-benzoxazine, 3,4'-dihydro-3-phenyl-2H-1,3-benzoxazine and bis(4-benzyl-3,4-dihydro -2H-1,3-benzoxazinyl)isopropane, can be used.

Furthermore, a so-called compound having a naphthoxazine ring structure (hereinafter, may also be described as naphthoxazine compound) can also be used. The naphthoxazine compound to be mixed is not particularly limited, but for example, bis (4,5-dihydro-5-phenyl-6H-3,5-oxazinyl) naphthalene(15 Na and 26 Na) and the like may be mentioned.

These compounds are illustrated in the FIG. 1 in the same order.

As for the mixing ratio of the telechelic polymer and the benzoxazine compound or naphthoxazine compound in the telechelic polymer composition, it is preferable to mix the benzoxazine compound or naphthoxazine Compound in an amount ranging from 20 parts by weight to 300 parts by weight, more preferably 50 parts by weight to 150 parts by weight, relative to 100 parts by weight of the telechelic polymer.

When the benzoxazine compound or naphthoxazine compound is incorporated in an amount of 300 parts by weight or more, toughness of the resin obtained after thermal curing may be deteriorated. Also, if the compound is incorporated in an amount of 20 parts by weight or less, toughness of the resin obtained after thermal curing may also be deteriorated, owing to unsatisfactory thermal curing.

The telechelic polymer composition can be produced by, for example, mechanically mixing the telechelic polymer (powdered) obtained as described above, with the benzoxazine compound or naphthoxazine compound (powdered).

The method of mixing the telechelic polymer and the benzoxazine compound or naphthoxazine compound is not particularly limited, but a method of mixing using a mixing machine such as a super mixer, a stone mill machine or a pressurized kneader, can be applied.

Curing by Heating of Telechelic Polymer Composition

The method for curing the telechelic polymer composition by heating is not particularly limited, but when the telechelic polymer composition is charged into a desired mold, and then cured by heating at a temperature of 180 to 260° C. for 30 minutes to 2 hours, a cured product can be obtained.

The telechelic polymer composition of the present invention can be easily subjected to film formation or the like, and the resulting cured product has excellent heat resistance and mechanical strength. Therefore, the composition can be suitably used in electric and electronic parts, automobile parts, copper clad laminate boards, refractory coatings, matrix resins for composite materials, and the like.

EXAMPLES

Hereinafter, the present invention will be described in more detail with reference to Examples, but the present invention is not intended to be limited to the Examples described below. In addition, the term percent means percent by weight in the following.

[Measurement Methods]

The methods for measuring properties in the present specification are as follows.

(1) GPC Spectrum

The measurement was performed using a Waters 440 ultraviolet (UV) detector manufactured by Waters Corp., and columns connected in series and packed with styrene gels having a pore size of 1000 nm, 100 nm and 50 nm, respectively, and using THF as the eluent.

(2) Fourier Transform Infrared Absorption Spectrum (FT-IR Spectrum)

Bomem Michelson MB100 FT-IR spectrometer, integration of 32 cycles in dry air, KBr pellets were used.

(3) Proton Nuclear Magnetic Resonance Spectrum ($^1$H-NMR spectrum)

$^1$H-NMR (600 MHz) manufactured by Varian Inova, Inc.

Deuterated dimethylsulfoxide was used, integration of 256 cycles, relation time of 10 seconds (4) Tensile Strength and Breaking Elongation During Tensile Test The measurement was performed according to ASTM D638-03, using an Instron universal tester (Model 5565).

The specimen form used was Type 5 (width 3.18 mm, length 9,53 mm), and an average of 5 samples was taken as the measured value.

The elongation at the time of fracture during the tensile test was taken as the breaking elongation.

Example 1

(Production of Telechelic Polymer)

To a round-bottom flask having a capacity of 200 cc equipped with a Dean-Stark collector, 4.36 g (0.02 moles) of 4,4'-difluorobenzophenone, 6.84 g (0.03 moles) of Bisphenol A, 5.56 g (0.04 moles) of potassium carbonate, 10 g of toluene, and 50 g of dimethylsulfoxide were added. While stirring, the temperature of an oil bath was elevated to 170° C., and a reaction was performed continuously for 2 hours while refluxing the solvent Then, the reaction solution was cooled to about 80° C.

Solids were removed from this solution by filtering, and the filtrate was added dropwise to 1 liter of a 1% aqueous acetic acid solution under vigorous stirring. Precipitated solids were filtered, and then washed with methanol. The obtained powder was subjected to vacuum drying for 24 hours in a vacuum oven heated to 50° C.

The molecular weight of the polymer was measured by GPC, and as a result, the number average molecular weight of this polymer was measured to be approximately 2200 (normalized to the reference of polystyrene).

Figure 2:
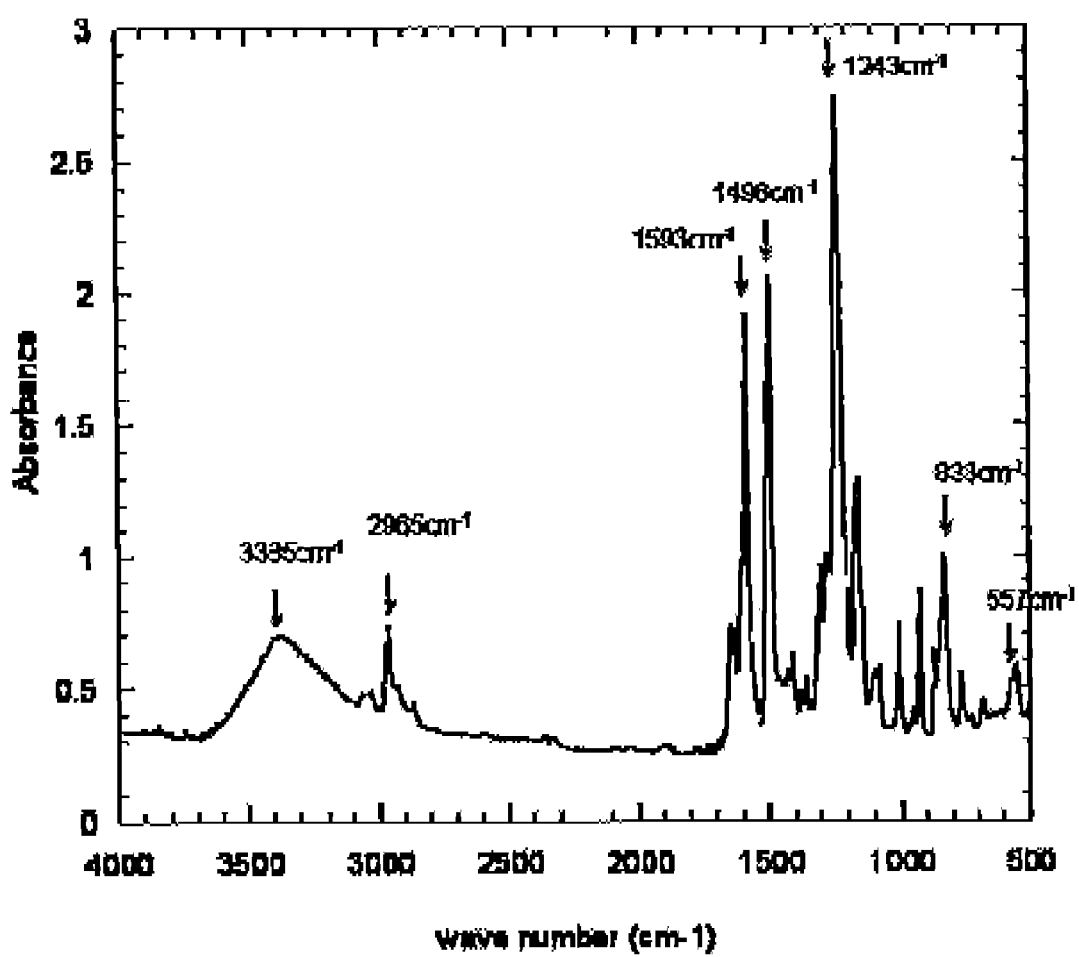
FIG. 2 shows a Fourier transform infrared absorption spectrum (FT-IR spectrum) of the telechelic polymer of Example 1.

An FT-IR spectrum of the resulting telechelic polymer is presented in FIG. 2

The peak of the terminal phenolic hydroxyl group is observed in the region of 3500 to 3300 cm$^{-1}$. The sharp peak shown near 2965 cm$^{-1}$ corresponds to the methylene of Bisphenol A. The sharp peak near 1243 cm$^{-1}$ corresponds to the aromatic ether.

The peaks appearing at 1593 cm$^{-1}$, 1498 cm$^{-1}$, 833 cm$^{-1}$ and 557 cm$^{-1}$ are believed to be the absorption of para-substituted benzene.

(Production of Telechelic Polymer Composition)

To 5 g of the telechelic polymer produced in the above, 5 g of a general-purpose benzoxazine compound, Bis(4-benzyl-3,4-dihydro-2H-1,3-benzoxazinyl)isopropane (Shikoku Chemical Corp.) was added, and the mixture was mixed for 5 minutes in a small size stone mill machine, to produce a telechelic polymer composition.

(Production of Sheet)

The telechelic polymer composition produced in the above was placed under a hot press releasably treated and controlled to a temperature of 180° C., and was subjected to curing by heating for 1 hour without pressurizing. Then, the resultant was cooled.

The novel telechelic polymer composition was molded into a sheet having a thickness of 0.1 mm.

The tensile strength and the breaking strength during the tensile test of this sheet were measured (Table 1).

Example 2

(Production of Telechelic Polymer Capped with Benzoxazine Ring Structure)

The telechelic polymer produced in Example 1 is further modified.

10 g (equivalent to 0.005 moles) of the telechelic polymer obtained in Example 1, a 40% aqueous solution of methylamine (Wako Pure Chemical Industries, Ltd.) (3.88 g, 0.05 moles), a 37% aqueous solution of formaldehyde (Wako Pure Chemical Industries, Ltd.) (8.1 g, 0.1 moles), and 70 g of chloroform were added to a flask having a capacity of 200 cc equipped with a reflux unit. While stirring, the temperature of an oil bath was elevated to 80° C., and a reaction was performed continuously for 12 hours while refluxing the solvent. Then, the reaction solution was cooled to normal temperature.

This solution was added dropwise to 1 liter of methanol under vigorous stirring. Precipitated solids were filtered, and then washed with methanol. The obtained powder was subjected to vacuum drying for 24 hours in a vacuum oven heated to 40° C.

Figure 3:
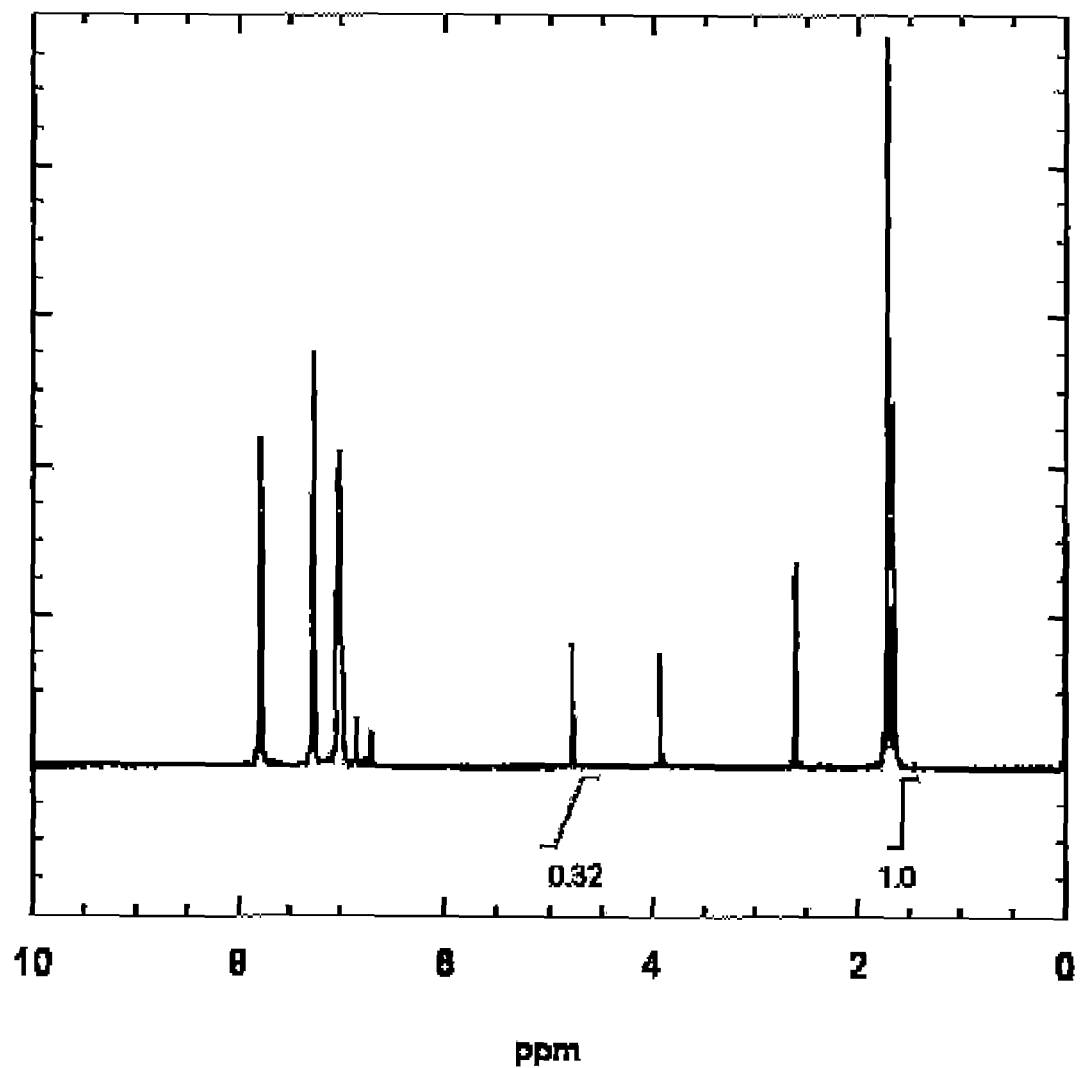
FIG. 3 shows a proton nuclear magnetic resonance spectrum ($^1$H-NMR spectrum) of the telechelic polymer of Example 2.

A $^1$H-NMR spectrum of the resulting powder is presented in FIG. 3.

Two peaks of identical size, which are characteristic to benzoxazine, are observed at 3.92 ppm and 4.81 ppm ((Ar—CH$_2$—N) and (O—CH$_2$—N), respectively).

A peak for the isopropyl of bisphenol (Ar—C—CH$_3$) is observed at 1.60 ppm, but since the peaks of the isopropyl at the end and of the isopropyl at the center are not equivalent, two peaks are seen when observed carefully.

(Production of Sheet)

The telechelic polymer capped with a benzoxazine ring structure produced in the above was placed under a hot press releasably treated and controlled to a temperature of 180° C., and was subjected to curing by heating for 1 hour without pressurizing. Then, the resultant was cooled.

The novel telechelic polymer composition was molded into a sheet having a thickness of 0.1 mm.

The tensile strength and the breaking elongation during the tensile test of this sheet were measured (Table 1).

Comparative Example 1

A general-purpose benzoxazine compound, bis(4-benzyl-3,4-dihydro-2H-1,3-benzoxazinyl)isopropane (Shikoku Chemical Corp.) was placed under a hot press releasably treated and controlled to a temperature of 180° C., and after heating the compound for 3 minutes to increase the melt viscosity, the compound was subjected to curing by heating for 1 hour without pressurizing. Then, the resultant was cooled.

The benzoxazine compound was molded into a sheet having a thickness of 0.1 mm.

The tensile strength and the breaking elongation during the tensile test of this sheet were measured (Table 1).

TABLE 1

|  | Breaking elongation during tensile test | Tensile strength |
|---|---|---|
| Example 1 | 5.5% | 85 MPa |
| Example 2 | 7.3% | 89 MPa |
| Comparative Example 1 | 1.1% | 42 MPa |

As it is obvious from the above results, the telechelic polymer composition of the present invention results in a tough resin composition having a large breaking elongation during tensile test, compared to conventional resins formed from benzoxazine compounds.

What is claimed is:

1. A telechelic polymer composition comprising a telechelic polymer having phenolic hydroxyl groups at both ends and having a weight average molecular weight in the range of 1,000 to 10,000, and a compound having a benzoxazine ring structure or a compound having a naphthoxazine ring structure, wherein the telechelic polymer has a polyether ketone structure in the main chain.

2. A telechelic polymer having at least 10% by mole or more of the phenolic hydroxyl groups at both ends of the polymer capped with a benzoxazine ring structure or a naphthoxazine ring structure, and having a weight average molecular weight in the range of 1,000 to 10,000, wherein the telechelic polymer has a polyether ketone structure in the main chain.

3. A telechelic polymer composition comprising the telechelic polymer according to claim 2.

* * * * *